Feb. 8, 1966  H. B. COOK  3,233,351
VERTICAL VEHICLE OPERATED GATES
Filed Sept. 6, 1963  2 Sheets-Sheet 1

INVENTOR.
HERBERT B. COOK,
BY
McMorrow, Berman & Davidson
ATTORNEYS.

Feb. 8, 1966            H. B. COOK            3,233,351

VERTICAL VEHICLE OPERATED GATES

Filed Sept. 6, 1963            2 Sheets-Sheet 2

INVENTOR.
HERBERT B. COOK,
BY
McMorrow, Berman & Davidson
ATTORNEYS.

United States Patent Office 3,233,351
Patented Feb. 8, 1966

3,233,351
VERTICAL VEHICLE OPERATED GATES
Herbert B. Cook, 603 Burkedale Ave.,
San Antonio 23, Tex.
Filed Sept. 6, 1963, Ser. No. 307,174
3 Claims. (Cl. 39—6)

This invention relates to novel vehicle operated gates of the vertically moving type.

The primary object of the invention is the provision of more efficient, more practical, and mechanically simpler and more reliable gates of the kind indicated, which are adapted to be both opened and closed, from opposite sides of the gates, by pressure exerted by vehicle wheels upon two-way control elements at ground level.

Another object of the invention is the provision of a gate of the character indicated above, whose operation is entirely mechanical and involves the movements of weighted levers, for raising the gates, which are elevated into operative positions by the gravity depression of the gates to open positions, from elevated closed positions.

Other important objects and advantageous features of the invention will be apparent from the following description and the accompanying drawings, wherein, for purposes of illustration only, a specific form of the invention is set forth in detail.

Figure 2:
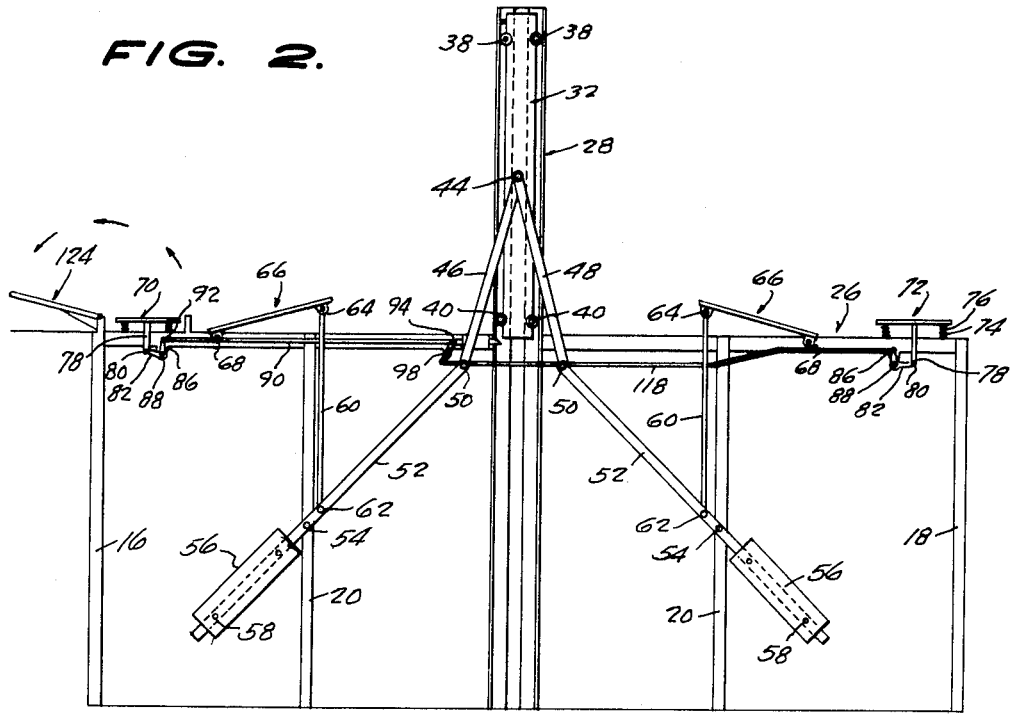
FIGURE 2 is a side elevation thereof taken on the line 2—2 of FIGURE 1, showing the gate in elevated closed position.

Referring in detail to the drawings, and first to FIGURES 1 to 5, the mechanically operated gate assembly therein shown comprises a longitudinally elongated trench 12, open, at its top, to the ground G, and preferably lined with concrete, and closed, at its top, by a top wall 14. The trench 12 extends similar distances beyond opposite sides of the wall or fence (not shown) in which the gate of the assembly is located.

In the trench 12 is fixed an angle-iron frame, which comprises laterally spaced first uprights 16, located at the end of the trench, at the outer side of the gate, and similar uprights 18, located at the end of the trench at the inner side of the gate, and first and second laterally intermediate uprights 20 spaced inwardly from the uprights 16 and 18, respectively. All of these uprights are located at the side walls of the trench. Horizontal, longitudinally elongated beams 24 and 26, flush with the surface of the ground G and the top wall 14, bear upon and are suitably fixed to the upper ends of the uprights at related sides of the trench 12.

Midway between the ends of the trench 12 and equally spaced from the intermediate uprights 20, are similar slideways 28, each of which is composed of a pair of facing and spaced perpendicular channels 30, which are suitably fixed to the laterally inward sides of the beams 24 and 26 and bear fixedly upon the bottom of the trench 12.

Figures 4, 5:
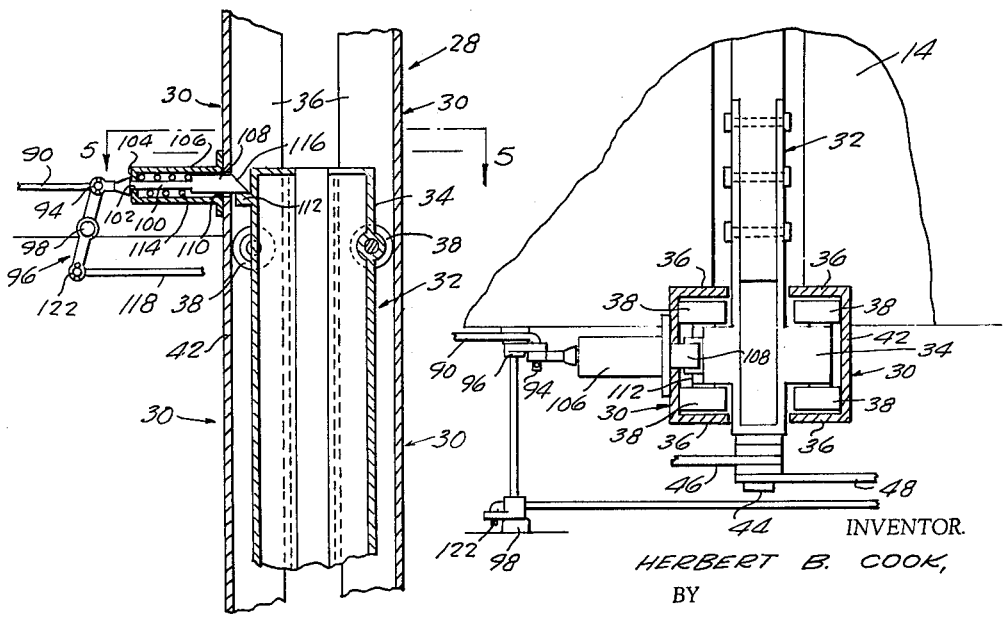
FIGURE 4 is an enlarged fragmentary vertical longitudinal section taken on the line 4—4 of FIGURE 1.
FIGURE 5 is a fragmentary horizontal section taken on the line 5—5 of FIGURE 4.

A rectangular flat gate 32 extends across the trench and through the spaces between the channels 30 of the slideways 28. The gate 32 has vertically elongated plates 34 fixed on its opposite sides and located within and spaced from the flanges 36 of the channels 30, on whose edges are mounted projecting anti-friction rollers 38 and 40, adjacent the upper and lower ends of the plates, which bear against the webs 42 of the channels, as shown in FIGURE 4. As shown in FIGURE 2, the slideways extend above the ground level, far enough only to accommodate the gate 32, in its elevated closed position, with its lower end substantially flush with the ground G.

At a midheight level thereof, the gate 32 is provided, on its ends, with pintles 44, on which are pivoted the upper ends of downwardly diverging inner and outer links 46 and 48, which extend downwardly through openings 50, in the beams 24 and 26. The links are severally pivoted, at their lower ends, as indicated at 50, to the inner ends of elongated longitudinally disposed levers 52, which are pivoted, as indicated at 54, on the intermediate frame uprights 20, at midheight points of the latter, the pivotal points of the levers being closer to their outer ends than to their inner ends. Elongated weights 56 extend along and are fixed to the levers 52, between their pivotal points and their outer ends. The weights 56 surround the levers 52 and are adjustable therealong and have fasteners 58 extending therethrough and adapted to bear against these levers for holding the weights in adjusted positions.

Vertical links 60, which work through the beams 24 and 26, are pivoted, at their lower ends, as indicated at 62, to the levers 52, at points near to and spaced longitudinally inwardly from the pivots 54 of the levers 52. The links 60 are pivoted, at their upper ends, as indicated at 64, to the undersides of and at the longitudinally inward edges of flat, transversely elongated treadle plates 66. The treadle plates 66 are pivoted, as indicated at 68, to the beams 24 and 26, at their longitudinally outward edges.

At the side of the gate assembly, adjacent to the beam 26, and mounted at the laterally inward side thereof, at the ends of the assembly, are similar vertical movable latch operating plates 70 and 72, which are located at the outer and inner sides, respectively, of the gate 32. The plates 70 and 72 have downwardly extending pins 74, working through coil springs 76 whereby these plates normally occupy elevated positions. These plates have fixed thereto prependicular downwardly and laterally outwardly extending rods 78, which are pivoted, as indicated at 80, to the outer arms 82 of bell cranks 84, which have inner arms 86. The bell cranks 84 are pivoted, as indicated at 88, at the meetings of their arms, to the beam 26.

A first longitudinal link 90 is pivoted, at one end, as indicated at 92, to the inner arm 86 of the bell crank related to the outer operating plate 70, and is pivoted, at its other end, as indicated at 94, to the upper end of a vertical lever 96, the lattern being pivoted intermediate its ends, as indicated at 98, on the beam 26, at a location near to and spaced from the adjacent side of the slideway 28 related to the beam 26. As shown in FIGURE 4, the first link 90 has an extension, on its inner end, in the form of a stem 100, which works through an opening 102 in an end wall 104 of a tubular guide 106, which is fixed to the web of the adjacent channel 30, and has an enlarged cross section latch head 108, on its end, which works through an opening 110, in the web 42, to engage a lateral stop 112, on the adjacent side of the gate 32, adjacent to the upper end of the gate, only in the depressed open position of the gate. A coil spring 114 is circumposed on the stem 100 and is compressed between the guide end wall 104 and the latch head 108. The latch head 108 has a downwardly beveled cam surface 116, on its end, which enables the gate 32 to cam the latch head out of the way as the gate descends from its elevated closed position toward its depressed open position.

A second horizontal link 118 is pivoted, at its outer end, as indicated at 120, to the inner arm 86 of the bell crank related to the inner latch operating plate 72, and is pivoted, at its inner end, as indicated at 122, to the lower end of the vertical lever 96. This arrangement enables the release of the latch head 108 from the gate stop 112, by depressing either of the operating plates, when the gate 32 is in its depressed position, so as to free the gate to be elevated by the passage of vehicle wheels over either of the treadle plates 66. Depression of either of the treadle plates 66 pushes the lever 52, inwardly and downwardly, toward the depressed positions shown in FIGURE 3, from the elevated positions shown in FIGURE 2, against the resistance of the weights 56, whereby the gate 32 is depressed from its elevated closed position, to its depressed open position.

As the gate 32 reaches its fully depressed position, the latch head 108 is projected over the stop 112, whereby the gate is held down, in its open position.

As the vehicle involved passes through the gate opening and depressed the other latch operating plate 72, the latch head 108 is withdrawn from the gate stop 112, whereby the weights 56 are freed to elevate the levers 562, and the links 46 and 48, so that the gate 32 is elevated to its closed position.

Figure 1:
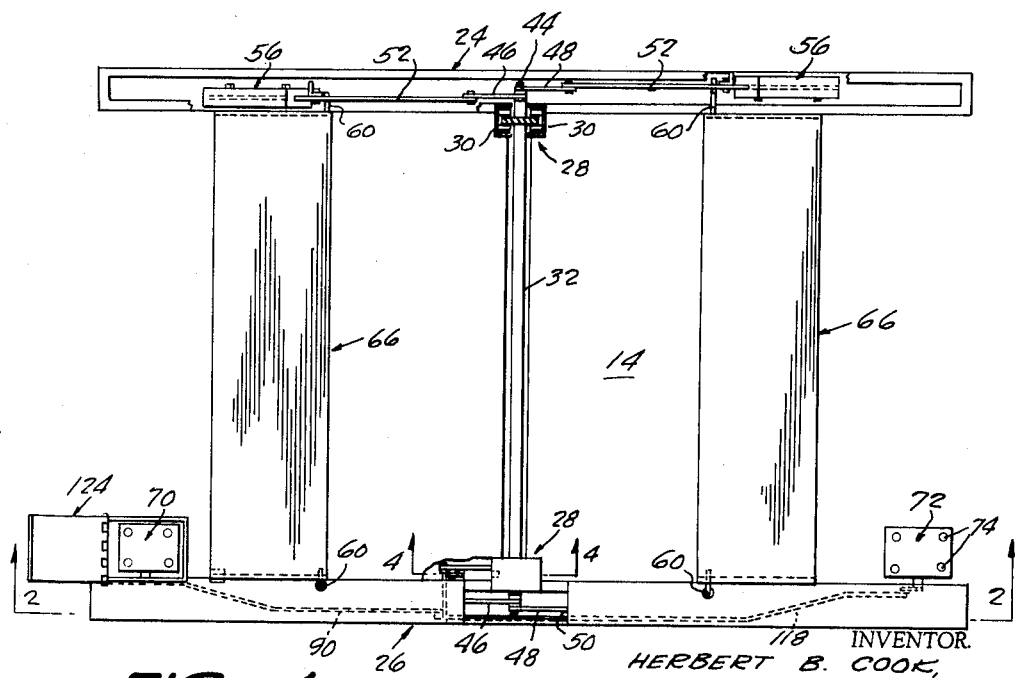
FIGURE 1 is a top plan view of mechanically operated gate assembly in accordance with the present invention, partly broken away and in section.
Figure 3:
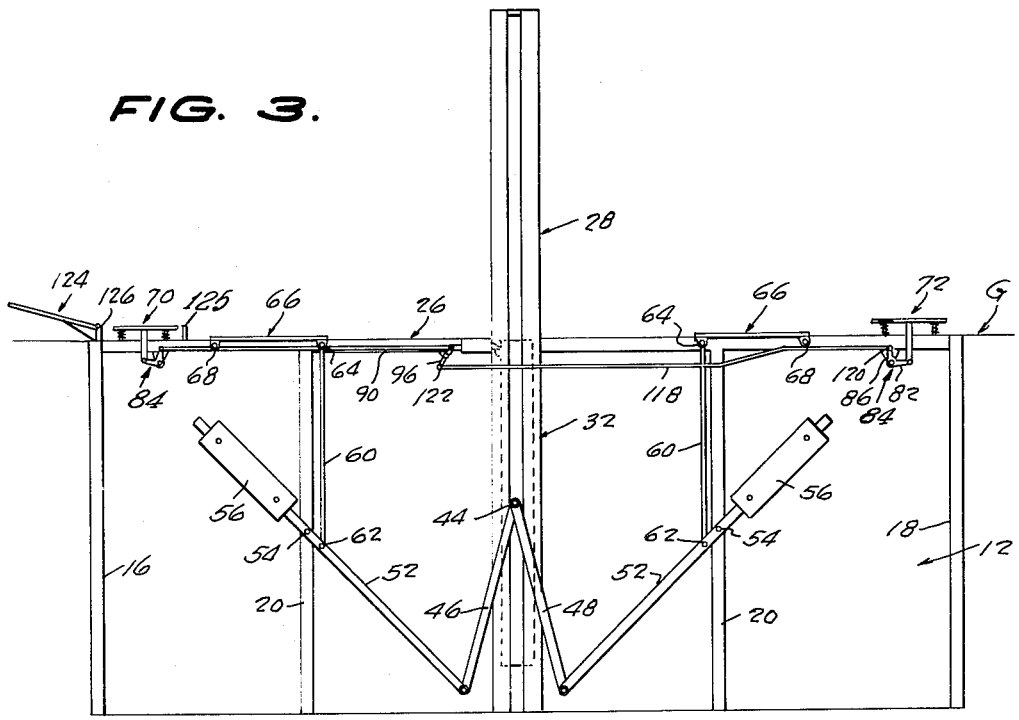
FIGURE 3 is a view like FIGURE 2, showing the gate in depressed open position.

As shown in FIGURES 1, 2 and 3, the outside or outer latch operating plate 70 is adapted to be protected against being depressed accidentally or by animals, in which case the gate 32 would be wantonly released from its depressed open position, by means of a cover plate 124 which is hinged, at its outer edge, as indicated at 125, on the beam 26, at the outer side of the plate 70. The cover plate 124 is adapted to be swung inwardly and downwardly over the plate 70, to a horizontal covering position, spaced above the plate 70, and bearing upon a stop 126, located at the inner side of the plate 70.

What is claimed is:

1. A vehicle operated gate comprising a trench opening to ground level, a frame mounted in the trench comprising intermediate uprights, first and second horizontal beams supported on the uprights at ground level, vertical slideways fixed to the beams between and spaced from the uprights, a gate slidably confined at its ends in the slideways, downwardly divergent links pivoted at their ends on a common axis to the side edges of the gate, levers pivoted intermediate their ends on the uprights, said levers having longitudinally outward and inward ends, weights on the outward ends of the levers, the inward ends of the levers being pivoted to the lower ends of the links, said gate having a lateral stop on one side thereof adjacent to its upper end, spring-pressed latch means on a beam for engaging over said stop in the depressed open position of the gate, said latch means having a cam for moving the latch means out of the way as the gate moves downwardly from its elevated closed position, and spring elevated latch operating plates mounted on the frame at ground level and at opposite sides of the gate, operating means connecting the latch plates to the latch means, and treadle plates pivoted on and extending between the beams, and vertical links pivoted at their upper ends to the treadle plates and at their lower ends to the levers at points spaced longitudinally inwardly from the pivotal points of the levers, said operating means comprising a vertical lever pivoted intermediate its end on the frame and pivoted at its upper end to the latch means, a first horizontal link pivoted at its inner end to the latch means and at its outer end to a latch means operating plate, and a second horizontal link pivoted at its inner end to the lower end of the vertical lever and at its outer end to the other latch means operating plate.

2. A vehicle operated gate assembly comprising a trench opening to ground level, an upstanding frame comprising opposed vertical slideways mounted in the trench and reaching above said ground level, a gate slidably-engaged at its ends in the slideways and movable between an elevated closed position above ground level and a depressed open position in the trench below the ground level, operating means for elevating and depressing the gate, said means comprising downwardly divergent links pivoted at their convergent ends on a common axis to the side edges of the gate, levers pivoted intermediate their ends to said frame and having one of the ends pivoted to the divergent ends of said links, weights on said levers between the pivots of said levers and the other of the ends thereof, treadle plates overlying the top of said frame and pivoted at one end to the top of said frame, vertical links having one of their ends pivoted to said levers inwardly of the pivots to said frame and having the other of their ends pivoted to said treadle plates, vertical movable latch-operating plates located at the top of said frame adjacent the opposite sides of the gate, bell cranks adjacent said latch-operating plates and pivoted to said frame, downwardly extending rods carried by said latch-operating plates and pivotally connected to one of the arms of said bell cranks, a first longitudinal link pivoted at one end to the other arm of the adjacent bell crank and pivoted at the other end to one end of a vertical lever pivoted intermediate its ends to said frame, a second horizontal link pivoted at one end to the other arm of the adjacent bell crank and pivoted at the other end to the other end of the vertical lever, a stop on said gate, and a spring-pressed latch means on said gate connecting said vertical lever to said stop for engaging over said stop in the depressed open position of the gate.

3. The gate according to claim 2, wherein said latch means has a cam for moving the latch means out of the way as the gate moves downwardly from its elevated closed position.

References Cited by the Examiner

UNITED STATES PATENTS

| | | | |
|---|---|---|---|
| 1,231,704 | 7/1917 | Canon | 39—18 |
| 1,271,655 | 7/1918 | Bettger | 292—94 X |
| 1,853,934 | 4/1932 | Shelter | 39—60 X |
| 1,988,889 | 1/1935 | Boardman | 39—6 X |
| 2,074,347 | 3/1937 | Steiner | 160—214 |
| 2,204,477 | 6/1940 | Ebaugh | 39—6 |
| 2,561,623 | 7/1951 | Hall | 39—7 |
| 2,561,683 | 7/1951 | Benke | 39—6 |
| 2,806,307 | 9/1957 | Fey | 39—6 |
| 3,034,240 | 5/1962 | Holt | 39—7 |

HARRISON R. MOSELEY, *Primary Examiner.*